(12) United States Patent
Su et al.

(10) Patent No.: US 12,505,094 B1
(45) Date of Patent: Dec. 23, 2025

(54) METHOD, APPARATUS, DEVICE, AND MEDIUM FOR GENERATING A RESPONSE

(71) Applicant: Beijing Zitiao Network Technology Co., Ltd., Beijing (CN)

(72) Inventors: Qi Su, Beijing (CN); Qinghong Chen, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 19/053,467

(22) Filed: Feb. 14, 2025

Related U.S. Application Data (63) Continuation of application No. PCT/CN2024/100339, filed on Jun. 20, 2024.

(51) Int. Cl.
*G06F 7/00* (2006.01)
*G06F 16/242* (2019.01)
*G06F 16/248* (2019.01)

(52) U.S. Cl.
CPC .......... *G06F 16/243* (2019.01); *G06F 16/248* (2019.01)

(58) Field of Classification Search
CPC .... G06F 16/243; G06F 16/248; G06F 16/337; G06F 16/3344; G06F 16/3329; G06F 16/313; G06F 16/35; G06F 16/2237; G06F 16/2247; G06F 16/56; G06F 16/285; G06N 20/00; G06N 20/20; G06N 5/01; G06N 5/043; G06N 5/02
See application file for complete search history.

(56) References Cited

U.S. PATENT DOCUMENTS

| | | | |
|---|---|---|---|
| 11,947,902 B1 | 4/2024 | Grimshaw et al. | |
| 2016/0140619 A1* | 5/2016 | Soni | H04L 51/52 705/14.66 |

(Continued)

FOREIGN PATENT DOCUMENTS

| | | |
|---|---|---|
| CN | 110121707 A | 8/2019 |
| CN | 112818109 A | 5/2021 |

(Continued)

OTHER PUBLICATIONS

International Patent Application No. PCT/CN2024/100339; International Search Report dated Feb. 19, 2025, 5 pages with machine translation.

(Continued)

*Primary Examiner* — Mohammad A Sana
(74) *Attorney, Agent, or Firm* — BakerHostetler (57) ABSTRACT

A method, an apparatus, a device, and a medium for generating a response are provided. In a method, a first data object is obtained. A plurality of candidate attitudes for a response to the first data object are provided. In response to receiving a first interaction request for a candidate attitude among the plurality of candidate attitudes, a second data object is generated as the response to the first data object, wherein second content of the second data object is determined based on first content of the first data object and the candidate attitude. In aid of the example embodiments of this disclosure, by providing a plurality of candidate attitudes, a user can easily select a desired attitude, and a response is automatically generated. Thereby, the complexity of user's operation can be reduced, and a response is generated in a simpler and more efficient way.

20 Claims, 6 Drawing Sheets (56) References Cited

U.S. PATENT DOCUMENTS

| | | | | |
|---|---|---|---|---|
| 2019/0370848 | A1* | 12/2019 | Shah | H04L 67/535 |
| 2024/0086648 | A1* | 3/2024 | Han | G06N 3/08 |
| 2024/0144192 | A1* | 5/2024 | Weissenberger | G06F 3/0482 |
| 2024/0419916 | A1* | 12/2024 | Agarwal | G06F 40/35 |

FOREIGN PATENT DOCUMENTS

| | | |
|---|---|---|
| CN | 116664093 A | 8/2023 |
| CN | 117519528 A | 2/2024 |
| CN | 117707675 A | 3/2024 |
| CN | 118092731 A | 5/2024 |

OTHER PUBLICATIONS

European Patent Application No. 24850310.4; Extended European Search Report dated Oct. 10, 2025, 12 pages.

* cited by examiner

METHOD, APPARATUS, DEVICE, AND MEDIUM FOR GENERATING A RESPONSE

CROSS REFERENCE TO RELATED APPLICATION

This application is a continuation of International Application No. PCT/CN2024/100339, filed on Jun. 20, 2024. The entire contents of this application are hereby incorporated by reference in their entireties.

FIELD

The example embodiments of this disclosure generally relate to the field of computing, and more particularly, to a method, an apparatus, a device, and a computer-readable storage medium for generating a response.

BACKGROUND

Machine learning techniques have been widely used to process various data objects. For example, a data object to be processed may be received, and a prompt may be constructed to utilize a machine learning model to generate a response to the data object. However, this process involves substantial manual operations, and it is desirable to simplify the operation process and generate responses to data objects in a more convenient and efficient manner.

SUMMARY

In a first aspect of the disclosure, a method for generating a response is provided. In the method, a first data object is obtained. A plurality of candidate attitudes for a response to the first data object is provided. In response to receiving a first interaction request for a candidate attitude among the plurality of candidate attitudes, a second data object is generated as the response to the first data object, wherein second content of the second data object is determined based on first content of the first data object and the candidate attitude.

In a second aspect of the disclosure, an apparatus for generating a response is provided. The apparatus includes: an obtaining module configured to obtain a first data object; a providing module configured to provide a plurality of candidate attitudes for a response to the first data object; and a generating module configured to, in response to receiving a first interaction request for a candidate attitude among the plurality of candidate attitudes, generate a second data object as the response to the first data object, wherein second content of the second data object is determined based on first content of the first data object and the candidate attitude.

In a third aspect of the disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the electronic device to perform the method according to the first aspect of the disclosure.

In a fourth aspect of the disclosure, a computer-readable storage medium is provided, having a computer program stored thereon, the computer program, when executed by a processor, causing the processor to perform the method according to the first aspect of the disclosure.

In a fifth aspect of the disclosure, a computer program product is provided, comprising a computer program, wherein the computer program, when executed by a processor, causes the processor to perform the method according to the first aspect of the disclosure.

It should be understood that the content described in this summary section is not intended to define key or essential features of the embodiments of this disclosure, nor is it intended to limit the scope of this disclosure. Other features of the disclosure will become readily apparent from the following description.

BRIEF DESCRIPTION OF THE DRAWINGS

In the following, the foregoing and other features, advantages, and aspects of the embodiments of the disclosure will become more apparent from the following detailed description when taken in conjunction with the accompanying drawings, in which like or similar reference numerals denote like or similar elements, and in which.

DETAILED DESCRIPTION

The embodiments of the disclosure will now be described more fully hereinafter with reference to the accompanying drawings. While the disclosure is shown in the drawings and described in connection with certain embodiments, it should be understood that the disclosure is capable of being embodied in various forms and should not be construed as being limited to the embodiments set forth herein; rather, these embodiments are provided so that this disclosure will be thorough and complete, and will fully convey the scope of the disclosure to those skilled in the art. It should be understood that the attached drawings and embodiments of the disclosure are for illustrative purposes only and are not meant to limit the scope of protection of the disclosure.

In the description of the embodiments of this disclosure, the term "comprising" and its linguistic variations are used in an open-ended fashion, and thus should be interpreted to mean "including, but not limited to." The term "based on" should be interpreted to mean "at least partially based on." The term "an embodiment" or "the embodiment" should be interpreted to mean "at least one embodiment." The term "some embodiments" should be interpreted to mean "at least some embodiments." Additional explicit and implicit definitions may also be included below. As used herein, the term "model" can represent a correlation between various data. For example, the correlation may be obtained based on a variety of technical solutions currently known and/or to be developed in the future.

It is understood that data involved in this technical solution (including, but not limited to, the data itself, its acquisition, or its usage) shall comply with applicable laws, regulations, and relevant provisions.

It is understood that prior to using the technical solutions disclosed in the embodiments of this disclosure, users should be informed of the types of personal information involved in this disclosure, the scope of use, usage scenarios, etc., and obtain user authorization, in accordance with applicable laws and regulations through appropriate means.

For example, in response to receiving a user's active request, prompt information is sent to the user to clearly inform the user that the operation they have requested will require the acquisition and use of their personal information. This allows users to decide independently, based on the prompt information, whether to provide personal information to the electronic device, application, server, or storage medium, or other software or hardware performing the operations of the technical solution of this disclosure.

As an optional, non-limiting embodiment, in response to receiving a user's active request, the prompt information may be sent to the user, for example, via a pop-up window. The prompt information can be presented in textual form within the pop-up window. Further, the pop-up window can include selection controls for the user to choose "Agree" or "Disagree" to provide personal information to the electronic device.

It should be understood that the aforementioned notification and user authorization process are merely illustrative and do not limit the embodiments of this disclosure. Other approaches that comply with relevant laws and regulations can also be applied to the embodiments of this disclosure.

As used herein, the term "in response to" indicates the state in which a corresponding event occurs or a condition is met. It will be understood that the timing of subsequent actions performed in response to the event or condition is not necessarily strongly correlated with the time of occurrence of the event or the time at which the condition becomes true. For example, in some instances, the subsequent action may be performed immediately upon the occurrence of the event or condition; whereas in other instances, the subsequent action may be performed sometime after the occurrence of the event or condition.

Example Environment

Figure 1:
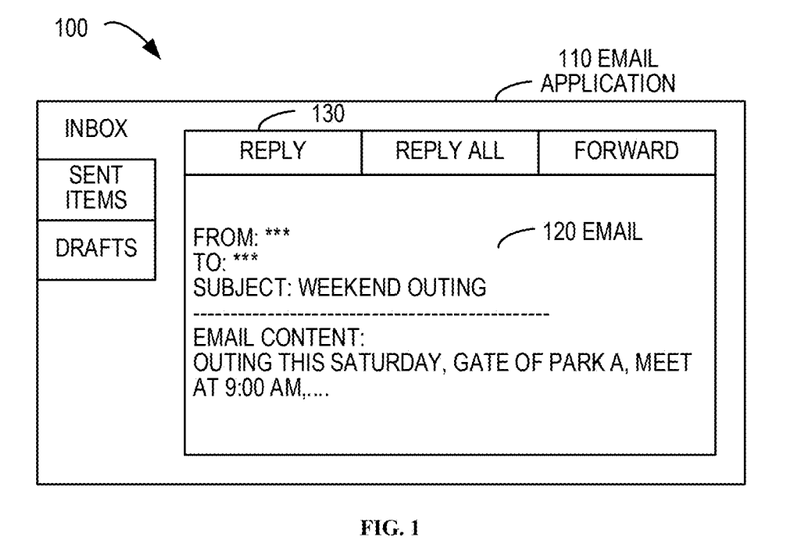
FIG. 1 illustrates a block diagram of an application environment according to an example embodiment of the disclosure.

Machine learning techniques have been widely used to process a variety of data objects. For example, a data object to be processed may be received and a prompt constructed to invoke a machine learning model to generate a response to the data object. Referring to FIG. 1, an application environment according to some embodiments of this disclosure is depicted. FIG. 1 illustrates a block diagram 100 of an application environment, according to an example embodiment of the disclosure. For illustrative purposes, an email application is used as an example below to describe the application environment according to some embodiments of the disclosure.

As illustrated in FIG. 1, in an email application 110, an email 120 may be received. The user may click a control 130 to reply to the email 120. At this point, the user needs to manually input text content. Although techniques have been proposed that utilize machine learning models to generate responses, the user still needs to manually construct prompts to specify the content to be included in the reply email. This process involves substantial manual operations, and the user may need to repeatedly adjust the prompts to obtain the desired response. It is therefore desirable to simplify the process and generate responses to data objects in a more convenient and efficient manner.

Overview of Response Generation

Figure 2:
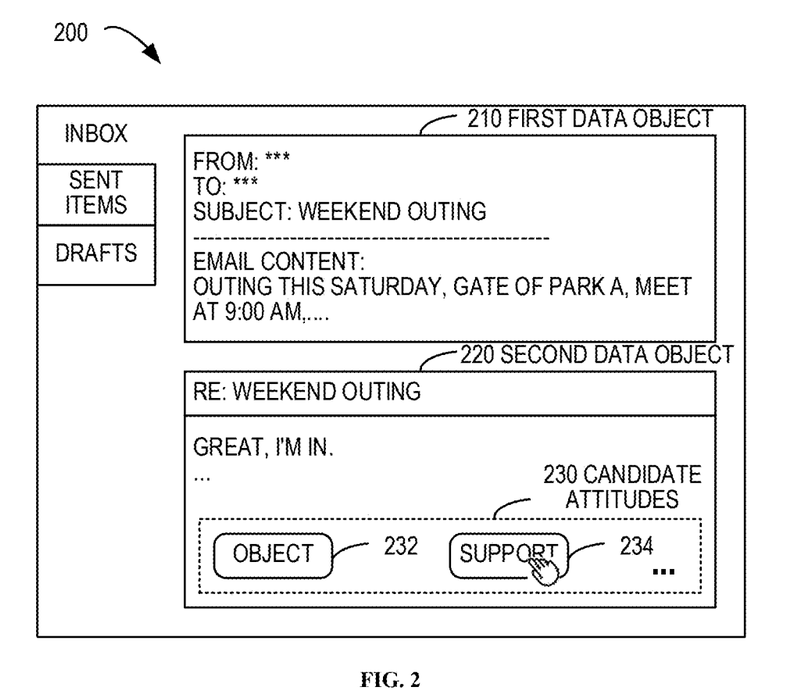
FIG. 2 illustrates a block diagram for generating a response according to some embodiments of the disclosure.

To at least partially address the shortcomings of the prior art, an example embodiment of this disclosure presents a method for generating a response. Referring to FIG. 2, an overview of an example embodiment according to this disclosure is depicted. FIG. 2 illustrates a block diagram 200 for generating a response, according to some embodiments of this disclosure. As shown in FIG. 2, a first data object (e.g., an email in an inbox) may be obtained. To facilitate generating a reply email, a plurality of candidate attitudes 230 for a response to the first data object 210 may be provided. For example, page element 232 may represent objecting to the content of the email, and page element 234 may represent supporting the content of the email, and so on. Here, the candidate attitudes may include, for example, "Positive," "Negative," or "Neutral," etc. Alternatively, and/or additionally, other page elements may be provided; for example, page elements representing attitudes such as "Not Interested" and/or "Need More Information" may be further provided.

The user can click on the above-mentioned page element to select a candidate attitude from the plurality of candidate attitudes. In response to receiving a first interaction request for a candidate attitude among the plurality of candidate attitudes 230, a second data object 220 can be generated as a response to the first data object 210. At this time, the second content (i.e., the body of the email) of the second data object 220 is determined based on the first content (e.g., the subject and/or body of the email, etc.) of the first data object 210 and the candidate attitude. As illustrated in FIG. 2, assuming a selection operation for page element 234 is received, a second data object 220 (i.e., a reply email) may be generated. In this case, the generated email expresses a supportive attitude: "Great, I'm in."

In aid of the example embodiment of this disclosure, by providing a plurality of candidate attitudes, the user can easily select the desired attitude, and then a response can be automatically generated. Thereby, the user does not have to manually input the response content nor manually construct a prompt, but can generate a response in a simpler and more efficient way.

Detailed Process of Response Generation

Figure 3:
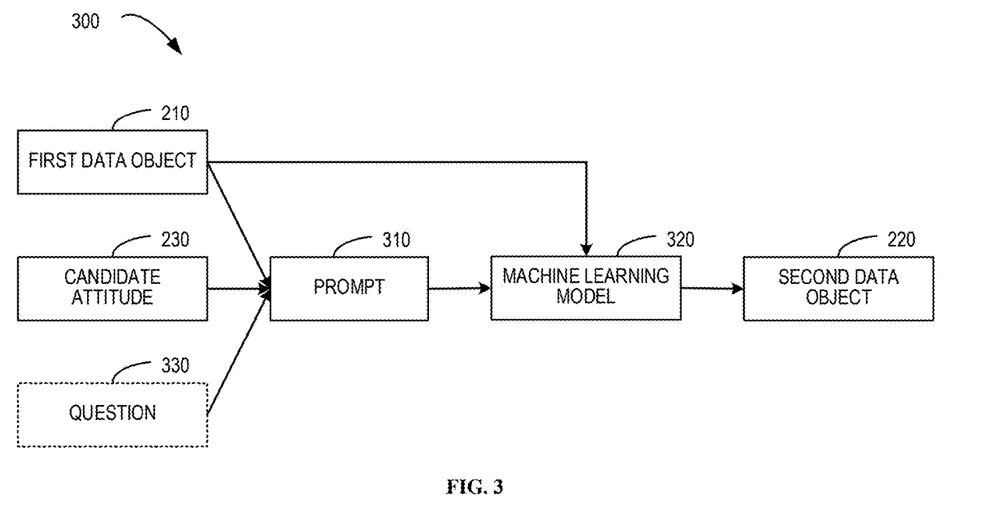
FIG. 3 illustrates a block diagram for generating a second data object using a machine learning model according to some embodiments of the disclosure.

Having described an overview according to some embodiments of the disclosure, more details regarding the response generation will now be described below. According to some embodiments of the disclosure, a machine learning model may be utilized to determine the content of the response. Specifically, a prompt can be determined based on the candidate attitude, the prompt specifying a task to be performed on the first data object, and the second content of the second data object can be obtained based on a response of the machine learning model to the prompt. Referring to FIG. 3, which illustrates a block diagram 300 for generating a second data object using a machine learning model according to some embodiments of the disclosure, a specific process is depicted.

As illustrated in FIG. 3, a prompt 310 may be determined based on the candidate attitude 230. The prompt 310 can instruct a machine learning model to generate a response to the first data object 210 and specify the attitude as "supportive." For example, the prompt 310 may include: "Please generate a reply email agreeing with the email content," and so on. As another example, the prompt 310 may include: "Please generate a reply email disagreeing with the email content," and so on. The prompt 310 and the first data object 210 can be input to a machine learning model 320 to generate the second data object 220. Alternatively and/or additionally, a portion of the information in the first data object 210 can be utilized to generate the prompt 310. In this case, the prompt 310 may include: "Please generate a reply email agreeing to the Saturday outing," etc.

In aid of the example embodiments of this disclosure, the user does not need to manually draft the reply email nor manually construct the prompt, but can automatically generate the reply email within the email application through simple interaction operations.

According to some embodiments of the disclosure, during the process of generating the second data object 220, to refine the specific content of the response, a question 330 associated with the second content of the second data object 220 may be provided, and the prompt 310 may be updated in response to receiving a second interaction request for the question 330. It can be determined based on the chosen attitude whether the user is required to supplement information. If supplementation is needed, a question may be provided to enable the user to supplement key points for the reply. Continuing with the above example, assuming the user objects to the weekend outing, the questions may include, but are not limited to: "Please provide the reasons for objection," "Please provide alternative dates," "Please provide alternative locations," etc. Alternatively and/or additionally, a fill-in-the-blank information supplementation template may be provided, or refining information regarding the response may be obtained in other ways. By means of the example embodiment of this disclosure, the specific content of the response can be refined and a response that better conforms to the user's intent can be generated.

Figure 4:
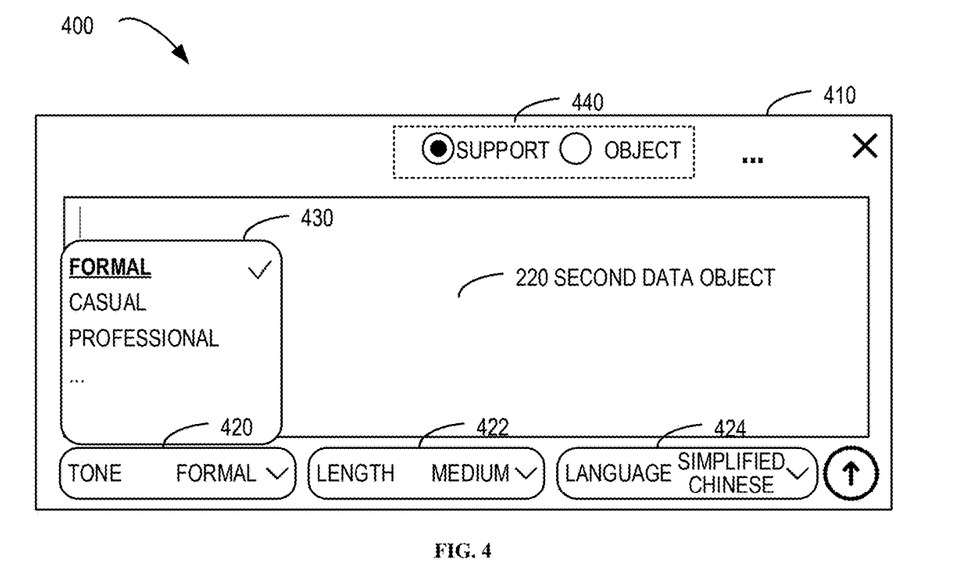
FIG. 4 illustrates a block diagram for determining a prompt according to some embodiments of the disclosure.

According to some embodiments of the disclosure, in the process of determining the prompt 310, a prompt template may be presented that specifies at least one attribute of the prompt 310. Further, the prompt may be generated in response to receiving a third interaction request for the at least one attribute. Referring to FIG. 4, which illustrates a block diagram 400 for determining a prompt according to some embodiments of the disclosure, more details are depicted. As shown in FIG. 4, a prompt template for generating the content of the second data object 220 may be presented in a page 410. Here, the page element 440 can be clicked to select a candidate attitude, such as supportive or opposed, etc. The page elements 420, 422, and 424 can be clicked to specify other attributes of the prompt.

For example, page element 420 may specify the tone of the generated response. In response to receiving an interaction request for page element 420, the desired tone can be selected from a plurality of candidates 430 (e.g., formal, casual, professional, etc.). As another example, page element 422 may specify the length of the generated response. In response to receiving an interaction request for page element 422, the desired length can be selected from a plurality of candidates (e.g., long, medium, short, etc.). As yet another example, page element 424 may specify the language of the generated response. In response to receiving an interaction request for page element 424, the desired language can be selected from a plurality of candidates (e.g., Simplified Chinese, English, etc.). In this way, the user can specify the content of a plurality of aspects of the response, thereby generating a response that better meets the user's expectations.

Figure 5:
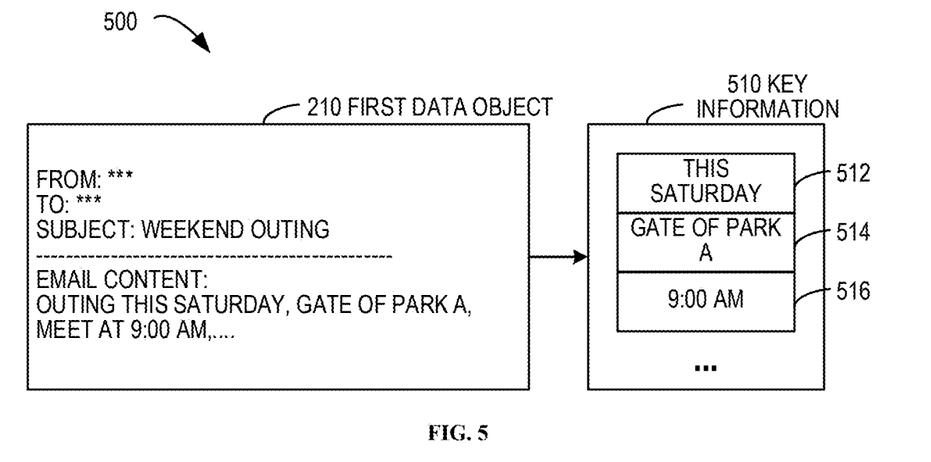
FIG. 5 illustrates a block diagram for extracting key information according to some embodiments of the disclosure.

According to some embodiments of the disclosure, key information in the first content of the first data object may be further determined, and portions associated with the key information highlighted in the response. Specifically, key content corresponding to the key information in the second content can be presented using a first format, and other content besides the key content in the second content can be presented using a second format. Referring to FIG. 5, which illustrates a block diagram 500 for extracting key information according to some embodiments of the disclosure, more details are depicted.

As illustrated in FIG. 5, key information 510 can be extracted from the first data object 210 based on various approaches. For example, the key information 510 may be determined based on syntactic and semantic analysis of the first content in the first data object 210. Alternatively and/or additionally, a machine learning model may be utilized to extract the key information 510. Here, the key information may include, for example: information item 512 indicating a date ("This Saturday"), information item 514 indicating a location ("Gate of Park A"), information item 516 indicating a time ("9:00 AM"), and so on.

Figure 6:
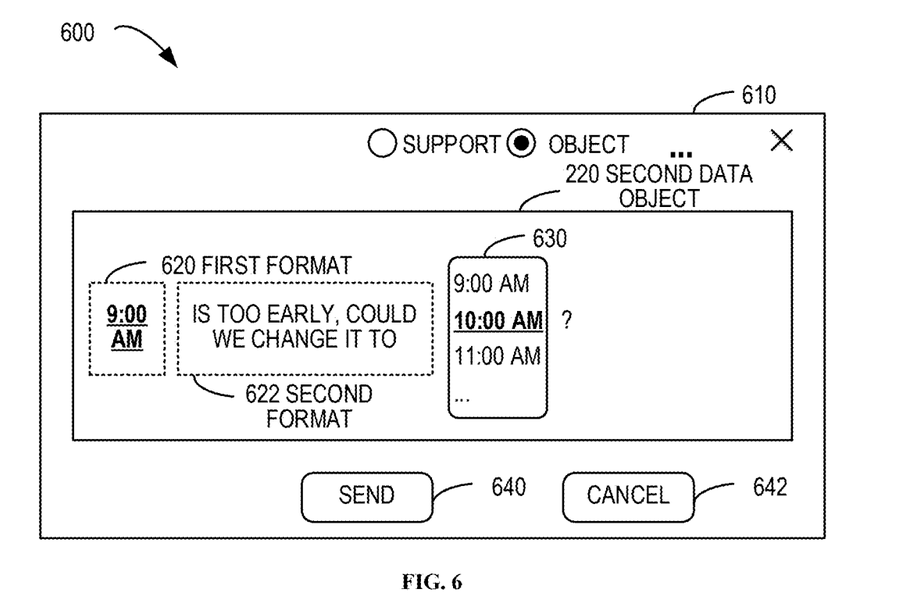
FIG. 6 illustrates a block diagram for editing a second data object according to some embodiments of the disclosure.

Further, different content in the second data object may be presented using different formats. Referring to FIG. 6, which illustrates a block diagram 600 for editing the second data object according to some embodiments of the disclosure, more information is depicted. As illustrated in FIG. 6, in page 610, the key content corresponding to the key information in the second content may be presented using a first format 620, and other content besides the key content in the second content may be presented using a second format 622. Specifically, content corresponding to the key time "9:00 AM" may be highlighted using an underline format, while other non-key parts of the generated content may be presented in a regular format.

It should be understood that underlining is merely an example. Alternatively and/or additionally, other colors (e.g., red, blue, etc.), fonts, font sizes, background colors, etc., may be used to present the key content "9:00 AM". Utilizing the example embodiments of this disclosure, key content associated with key information in the response can be presented in a more prominent manner. In this way, the user can be reminded to pay more attention to the key content, thereby assisting the user in performing subsequent editing operations.

According to some embodiments of this disclosure, candidate content for the key content may be presented, and the key content updated with the candidate content in response to receiving a fourth interaction request for the candidate content. Continuing with reference to FIG. 6, when the user answers questions, if the user believes that 9:00 AM is too early, the machine learning model can automatically generate a plurality of candidate content items (e.g., 9:00 AM, 10:00 AM, 11:00 AM, etc.) corresponding to the key content "9:00 AM". For example, page element 630, including the plurality of candidate content items, can be presented to enable the user to select a suitable time.

Assuming the user selects "10:00 AM", in response to receiving an interaction request for the candidate content, "9:00 AM" may be updated to "10:00 AM". At this point, "9:00 AM is too early, could we change it to 10:00 AM" may be automatically generated. In aid of the example embodiments of this disclosure, candidate content for the key content can be automatically provided to allow the user to update the second content of the second data object 220 with simple interaction requests, such as clicking and selecting.

According to some embodiments of this disclosure, the user may edit the content of the second data object. Specifically, the second content of the second data object is updated in response to receiving a fifth interaction request for the second content of the second data object, based on the fifth interaction request. For example, the user can add, delete, or modify the second content to achieve the desired response. Utilizing the example embodiments of this disclosure, a machine learning model may be used to generate the main part of the response, and the user is only required to perform simple editing operations to complete the response.

According to some embodiments of the disclosure, the second data object is submitted as the response to the first data object in response to receiving a sixth interaction request to confirm the second data object. As illustrated in FIG. 6, the user can click on page element 640 to confirm and send the generated email, or click page element 642 to cancel the email. In this case, the email application can detect interaction requests related to the aforementioned page elements to perform the corresponding actions. In this way, the process of generating and sending responses can be performed automatically, thereby reducing the complexity of user operations.

According to some embodiments of the disclosure, the method described above can be implemented in an application for providing the first data object. It should be understood that although the details of generating a response have been described above using an email application as a specific application environment, the method can alternatively and/or additionally be implemented in other types of applications. For example, the method can be implemented in an instant messaging application, in which case the first data object may be a message sent by another user, and the method described above can be used to automatically generate a response to the message. As another example, the method can be implemented in a social networking application, in which case the first data object may be an article published by another user, and the method described above can be used to automatically generate a response to the article. As yet another example, the method may be implemented in a video application, in which case the first data object may be a video, and the method described above may be used to automatically generate a comment on the video.

According to some embodiments of the disclosure, the first data object and the second data object may have the same modality or different modalities; that is, the first modality of the first data object is different from the second modality of the second data object. For example, in the context of an email application, both the first data object and the second data object can be in text modality; as another example, in the context of a social networking application, the first data object may include text and images, while the second data object may include only text. Utilizing the example embodiment of this disclosure, generating response data across a plurality of modalities is supported.

Figure 7:
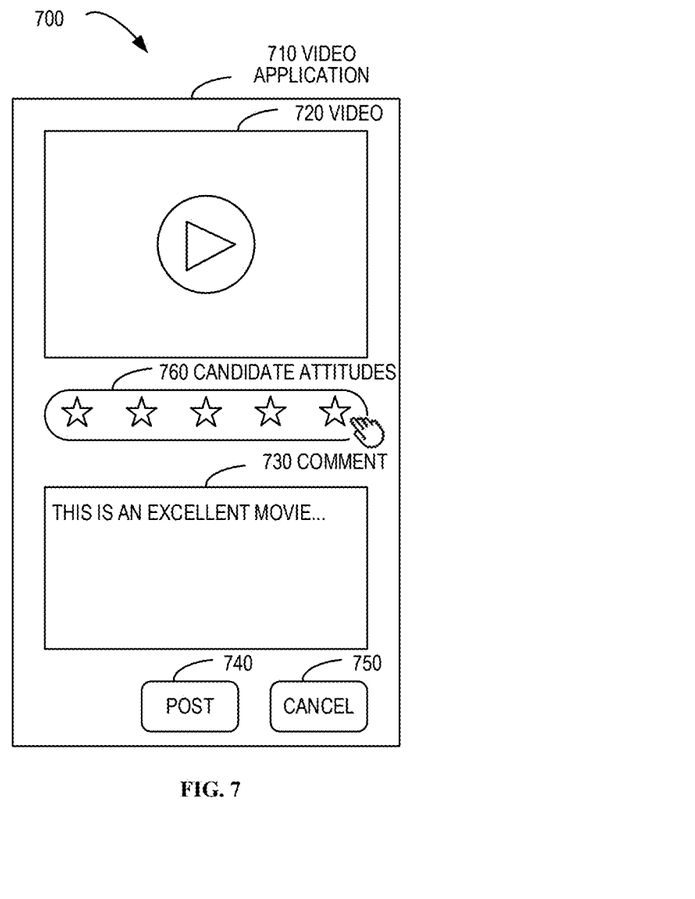
FIG. 7 illustrates a block diagram for generating comments for a video according to some embodiments of the disclosure.

FIG. 7 illustrates a block diagram 700 for generating comments for a video according to some embodiments of the disclosure. As illustrated in FIG. 7, in a video application 710, a video 720 and candidate attitudes 760 for the video can be provided. The user can watch the video and input their attitude toward the video (e.g., 0-5 stars, with 0 stars representing objection and 5 stars representing support). At this time, a comment 730 can be automatically generated, such as, "This is an excellent movie . . . ", and the user can edit the comment 730, click page element 740 to publish the comment 730, or click page element 750 to cancel the comment 730. Alternatively and/or additionally, the user may input an attitude of "3 stars" using a sliding operation, in which case the generated comment might include, "This movie is not bad, . . . ".

Utilizing the example embodiment of this disclosure, by providing a plurality of candidate attitudes, the user can easily select the desired attitude, and then a response can be automatically generated. In this manner, the user does not have to manually input the response content nor manually construct a prompt, but can generate a response in a simpler and more efficient way.

Example Process

Figure 8:
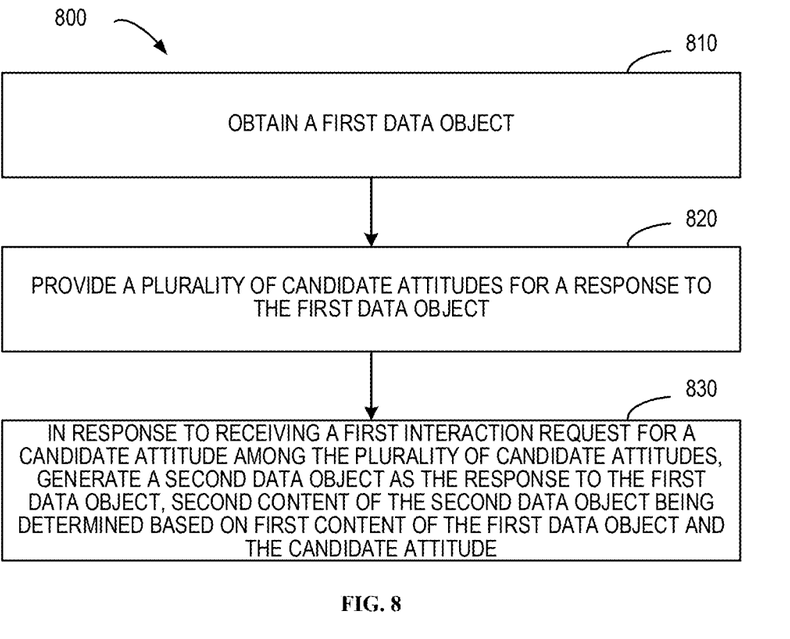
FIG. 8 illustrates a flow diagram of a method for generating a response according to some embodiments of the disclosure.

FIG. 8 illustrates a flowchart of a method 800 for generating a response, according to some embodiments of this disclosure. At block 810, a first data object is obtained. At block 820, a plurality of candidate attitudes for a response to the first data object are provided. At block 830, in response to receiving a first interaction request for a candidate attitude among the plurality of candidate attitudes, a second data object is generated as the response to the first data object, wherein the second content of the second data object is determined based on the first content of the first data object and the candidate attitude.

According to some embodiments of this disclosure, the second content of the second data object is determined by: determining a prompt based on the candidate attitude, the prompt specifying a task to be performed on the first data object; and obtaining the second content of the second data object based on a response of a machine learning model to the prompt.

According to some embodiments of this disclosure, determining the prompt comprises: presenting a prompt template, the prompt template specifying at least one attribute of the prompt; and generating the prompt in response to receiving a second interaction request for the at least one attribute.

According to some embodiments of this disclosure, determining the prompt further comprises: providing a question associated with the second content of the second data object; and updating the prompt in response to receiving a third interaction request for the question.

According to some embodiments of this disclosure, the method 800 further comprises: determining key information in the first content of the first data object; presenting key content corresponding to the key information in the second content using a first format; and presenting other content besides the key content in the second content using a second format.

According to some embodiments of this disclosure, the method 800 further comprises: presenting candidate content for the key content; and updating the key content with the candidate content in response to receiving a fourth interaction request for the candidate content.

According to some embodiments of this disclosure, the method 800 further comprises: updating the second content of the second data object based on a fifth interaction request, in response to receiving the fifth interaction request for the second content of the second data object.

According to some embodiments of this disclosure, the method 800 further comprises: submitting the second data object as the response to the first data object in response to receiving a sixth interaction request to confirm the second data object.

According to some embodiments of this disclosure, the method 800 is implemented in an application for providing the first data object.

According to some embodiments of this disclosure, a first modality of the first data object is different from a second modality of the second data object.

Example Apparatus and Device

Figure 9:
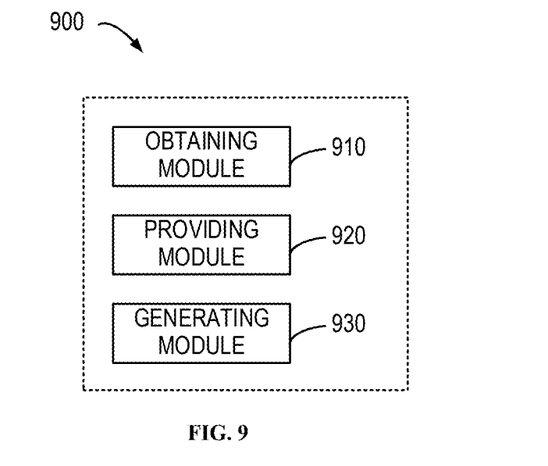
FIG. 9 illustrates a block diagram of an apparatus for generating a response according to some embodiments of the disclosure.

FIG. 9 illustrates a block diagram of an apparatus 900 for generating a response, according to some embodiments of this disclosure. The apparatus 900 includes: an obtaining module 910 configured to obtain a first data object; a providing module 920 configured to provide a plurality of candidate attitudes for a response to the first data object; and a generating module 930 configured to, in response to receiving a first interaction request for a candidate attitude among the plurality of candidate attitudes, generate a second data object as the response to the first data object, wherein second content of the second data object is determined based on first content of the first data object and the candidate attitude.

According to some embodiments of this disclosure, the second content of the second data object is determined by: determining a prompt based on the candidate attitude, the prompt specifying a task to be performed on the first data object; and obtaining the second content of the second data object based on a response of a machine learning model to the prompt.

According to some embodiments of this disclosure, the generating module is further configured to: present a prompt template, the prompt template specifying at least one attribute of the prompt; and generate the prompt in response to receiving a second interaction request for the at least one attribute.

According to some embodiments of this disclosure, the generating module is further configured to: provide a question associated with the second content of the second data object; and update the prompt in response to receiving a third interaction request for the question.

According to some embodiments of this disclosure, the apparatus further includes an interaction module configured to: determine key information in the first content of the first data object; present key content corresponding to the key information in the second content using a first format; and present other content besides the key content in the second content using a second format.

According to some embodiments of this disclosure, the interaction module is further configured to: present candidate content for the key content; and update the key content with the candidate content in response to receiving a fourth interaction request for the candidate content.

According to some embodiments of this disclosure, the interaction module is further configured to: update the second content of the second data object based on a fifth interaction request, in response to receiving the fifth interaction request for the second content of the second data object.

According to some embodiments of this disclosure, the interaction module is further configured to: submit the second data object as the response to the first data object in response to receiving a sixth interaction request to confirm the second data object.

According to some embodiments of this disclosure, the apparatus is implemented in an application for providing the first data object.

According to some embodiments of this disclosure, a first modality of the first data object is different from a second modality of the second data object.

Figure 10:
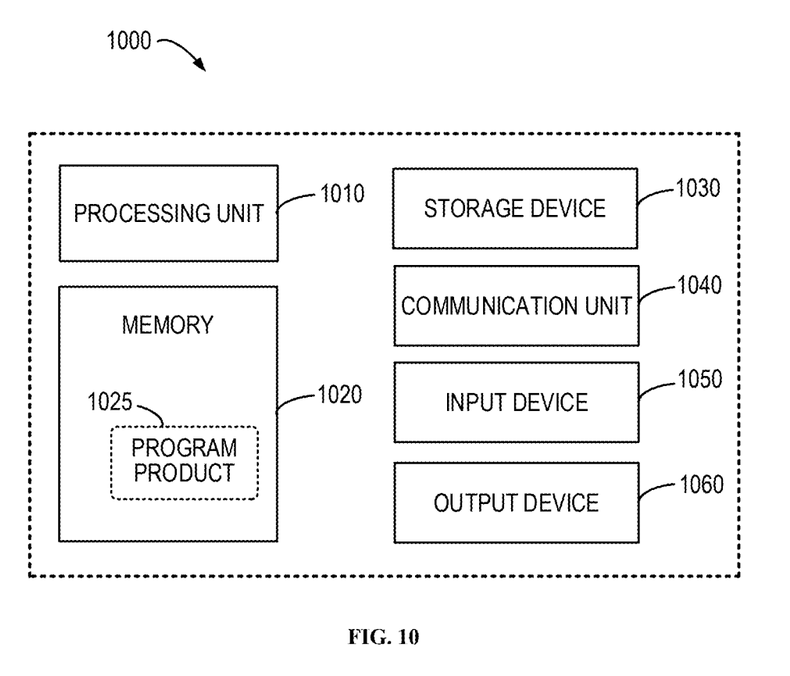
FIG. 10 illustrates a block diagram of a device capable of implementing the various embodiments of the disclosure.

FIG. 10 illustrates a block diagram of a device 1000 capable of implementing the various embodiments of this disclosure. It should be understood that the computing device 1000 illustrated in FIG. 10 is merely example and is not intended to limit the functionality and scope of the implementations described herein in any way. The computing device 1000 shown in FIG. 10 may be used to implement the methods described above.

As illustrated in FIG. 10, computing device 1000 is in the form of a general-purpose computing device. The components of computing device 1000 can include, but are not limited to, one or more processors or processing units 1010, memory 1020, storage device 1030, one or more communication units 1040, one or more input devices 1050, and one or more output devices 1060. Processing unit 1010 can be a physical or virtual processor and is capable of performing various processes according to programs stored in memory 1020. In a multi-processor system, a plurality of processing units execute computer-executable instructions in parallel to improve the parallel processing capability of computing device 1000.

Computing device 1000 typically includes a variety of computer-readable storage media. Such media can be any available media that is accessible by computing device 1000 and includes both volatile and non-volatile media, removable and non-removable media. Memory 1020 can be volatile memory (e.g., registers, cache, random access memory (RAM)), non-volatile memory (e.g., read-only memory (ROM), electrically erasable programmable read-only memory (EEPROM), flash memory), or a combination thereof. Storage device 1030 can be removable or non-removable media and can include machine-readable media such as flash drives, disks, or any other medium that can be used to store information and/or data (e.g., training data for training) and that can be accessed within computing device 1000.

Computing device 1000 can further include other removable/non-removable, volatile/non-volatile computer storage media. By way of example, and not limitation, storage device 1030 can include a hard disk drive for reading from and writing to non-removable, non-volatile magnetic media, a magnetic disk drive for reading from or writing to a removable, non-volatile magnetic disk (e.g., a "floppy disk"), and an optical disk drive for reading from or writing to a removable, non-volatile optical disk such as a CD-ROM or other optical media. In such instances, each drive can be connected to a system bus (not shown) by one or more data media interfaces. Memory 1020 can include a computer program product 1025 having one or more program modules configured to carry out various methods or actions of the various embodiments of the disclosure.

Communication unit 1040 allows for communication with other computing devices over a communications medium. Additionally, the functionality of the components of computing device 1000 can be implemented in a single computing cluster or a plurality of computing machines that are capable of communicating via a communication connection. Accordingly, computing device 1000 can operate in a networked environment using logical connections to one or more other servers, network personal computers (PCs), or other network nodes.

Input device 1050 can be one or more input devices such as a mouse, keyboard, trackball, etc. Output device 1060 can be one or more output devices such as a display, speakers, a printer, etc. Computing device 1000 can also communicate with one or more external devices (not shown) such as storage devices, display devices, etc., with one or more devices that allow a user to interact with computing device 1000, or with any devices (e.g., network card, modem, etc.) that allow computing device 1000 to communicate with one or more other computing devices as needed, through communication unit 1040. Such communication can occur via input/output (I/O) interfaces (not shown).

In an example embodiment of this disclosure, a computer-readable storage medium is provided, storing computer-executable instructions thereon, wherein the computer-executable instructions, when executed by a processor, cause the processor to perform the methods described above. In another example embodiment of this disclosure, a computer program product is provided, tangibly embodied in a non-transitory computer-readable medium and including computer-executable instructions that, when executed by a processor, cause the processor to perform the methods described above. In yet another example embodiment of this disclosure, a computer program product is provided, having a computer program stored thereon, wherein the program, when executed by a processor, performs the methods described above.

The various aspects of the present disclosure are described herein with reference to flowchart illustrations and/or block diagrams of methods, apparatuses, devices, and computer program products according to the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable storage medium that can direct a computer, other programmable data processing apparatus, and/or other devices to function in a particular manner, such that the computer-readable storage medium storing the instructions includes a manufacture comprising instructions for implementing the function/act specified in the flowchart and/or block diagram block or blocks.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

The embodiments of this disclosure have been described. The descriptions above are example rather than exhaustive and are not intended to limit the embodiments disclosed herein. Many modifications and variations will be apparent to those of ordinary skill in the art without departing from the scope and spirit of the described embodiments. The terminology used herein was chosen to best explain the principles of the embodiments, the practical application, or technical improvements to the prior art, or to enable others of ordinary skill in the art to understand the embodiments disclosed herein.

What is claimed is:

1. A method for automatically generating responses, comprising:
    displaying, via an interface, a first data object comprising first content;
    displaying, via the interface, a plurality of user interface elements, wherein each of the plurality of user interface elements corresponds to one of a plurality of candidate attitudes, and wherein each of the plurality of candidate attitudes indicate a desired characteristic of a response to the first data object;
    receiving a user selection of a user interface element among the plurality of user interface elements, wherein the selected user interface element corresponds to a candidate attitude among the plurality of candidate attitudes;
    generating a prompt based on the candidate attitude corresponding to the selected user interface element; and
    generating, in response to inputting the prompt into a machine learning model, a second data object as the response to the first data object, wherein second content of the second data object is determined based on the first content and the candidate attitude corresponding to the selected user interface element.

2. The method of claim 1, wherein the second content of the second data object is determined by:
    obtaining the second content of the second data object based on a response of the machine learning model to the prompt.

3. The method of claim 1, wherein generating the prompt comprises:
    providing a question associated with the second content of the second data object; and
    updating the prompt in response to receiving a second interaction request for the question.

4. The method of claim 1, wherein generating the prompt comprises:
    presenting a prompt template, the prompt template specifying at least one attribute of the prompt; and
    generating the prompt in response to receiving a third interaction request for the at least one attribute.

5. The method of claim 1, further comprising:
    determining key information in the first content of the first data object;
    presenting key content in the second content corresponding to the key information using a first format; and
    presenting other content in the second content besides the key content using a second format.

6. The method of claim 5, further comprising:
presenting candidate content for the key content; and
updating the key content with the candidate content in response to receiving a fourth interaction request for the candidate content.

7. The method of claim 1, further comprising: updating, in response to receiving a fifth interaction request for the second content of the second data object, the second content of the second data object based on the fifth interaction request.

8. The method of claim 1, further comprising: submitting, in response to receiving a sixth interaction request to confirm the second data object, the second data object as the response to the first data object.

9. The method of claim 1, wherein the method is implemented in an application for providing the first data object.

10. The method of claim 1, wherein a first modality of the first data object is different from a second modality of the second data object.

11. An electronic device, comprising:
at least one processor; and
at least one memory coupled to the at least one processor and storing instructions for execution by the at least one processor, wherein the instructions, when executed by the at least one processor, cause the electronic device to perform acts comprising:
displaying, via an interface, a first data object comprising first content;
displaying, via the interface, a plurality of user interface elements, wherein each of the plurality of user interface elements corresponds to one of a plurality of candidate attitudes, and wherein each of the plurality of candidate attitudes indicate a desired characteristic of a response to the first data object;
receiving a user selection of a user interface element among the plurality of user interface elements, wherein the selected user interface element corresponds to a candidate attitude among the plurality of candidate attitudes;
generating a prompt based on the candidate attitude corresponding to the selected user interface element; and
generating, in response to inputting the prompt into a machine learning model, a second data object as the response to the first data object, wherein second content of the second data object is determined based on the first content and the candidate attitude corresponding to the selected user interface element.

12. The electronic device of claim 11, wherein the second content of the second data object is determined by:
obtaining the second content of the second data object based on a response of the machine learning model to the prompt.

13. The electronic device of claim 11, wherein generating the prompt comprises:
providing a question associated with the second content of the second data object; and
updating the prompt in response to receiving a second interaction request for the question.

14. The electronic device of claim 11, wherein generating the prompt comprises:
presenting a prompt template, the prompt template specifying at least one attribute of the prompt; and
generating the prompt in response to receiving a third interaction request for the at least one attribute.

15. The electronic device of claim 11, further comprising:
determining key information in the first content of the first data object;
presenting key content in the second content corresponding to the key information using a first format; and
presenting other content in the second content besides the key content using a second format.

16. The electronic device of claim 15, further comprising:
presenting candidate content for the key content; and
updating the key content with the candidate content in response to receiving a fourth interaction request for the candidate content.

17. The electronic device of claim 11, further comprising: updating, in response to receiving a fifth interaction request for the second content of the second data object, the second content of the second data object based on the fifth interaction request.

18. The electronic device of claim 11, further comprising: submitting, in response to receiving a sixth interaction request to confirm the second data object, the second data object as the response to the first data object.

19. The electronic device of claim 11, wherein a first modality of the first data object is different from a second modality of the second data object.

20. A non-transitory computer-readable storage medium having a computer program stored thereon, the computer program, when executed by a processor, causing the processor to perform acts comprising:
displaying, via an interface, a first data object comprising first content;
displaying, via the interface, a plurality of user interface elements, wherein each of the plurality of user interface elements corresponds to one of a plurality of candidate attitudes, and wherein each of the plurality of candidate attitudes indicate a desired characteristic of a response to the first data object;
receiving a user selection of a user interface element among the plurality of user interface elements, wherein the selected user interface element corresponds to a candidate attitude among the plurality of candidate attitudes;
generating a prompt based on the candidate attitude corresponding to the selected user interface element; and
generating, in response to inputting the prompt into a machine learning model, a second data object as the response to the first data object, wherein second content of the second data object is determined based on the first content and the candidate attitude corresponding to the selected user interface element.

* * * * *